(12) United States Patent
Richard

(10) Patent No.: US 6,895,143 B2
(45) Date of Patent: May 17, 2005

(54) OPTICAL SWITCHING DEVICE COMPRISING TWO WAVEGUIDES WHEREOF BOTH SMALLEST DIMENSIONS ARE LESS THAN THE GUIDED WAVELENGTHS

(75) Inventor: Nicolas Richard, Dijon (FR)

(73) Assignee: Thomson Licensing S. A., Boulogne-Billancourt (FR)

( * ) Notice: Subject to any disclaimer, the term of this patent is extended or adjusted under 35 U.S.C. 154(b) by 89 days.

(21) Appl. No.: 10/432,314

(22) PCT Filed: Nov. 15, 2001

(86) PCT No.: PCT/FR01/03576

§ 371 (c)(1),
(2), (4) Date: May 21, 2003

(87) PCT Pub. No.: WO02/42812

PCT Pub. Date: May 30, 2002

(65) Prior Publication Data

US 2004/0028318 A1 Feb. 12, 2004

(30) Foreign Application Priority Data

Nov. 24, 2000 (FR) .............................. 00 15228

(51) Int. Cl.[7] ................................ G02B 6/42
(52) U.S. Cl. .......................... 385/31; 385/16
(58) Field of Search .............. 385/16–24, 31, 385/42, 130

(56) References Cited

U.S. PATENT DOCUMENTS

| 6,181,843 | B1 | * | 1/2001 | Lee et al. | ................ | 385/16 |
| 6,456,765 | B1 | * | 9/2002 | Klocek et al. | ............ | 385/42 |
| 6,741,782 | B2 | * | 5/2004 | Berini | ................ | 385/130 |

FOREIGN PATENT DOCUMENTS

| EP | 1026675 | 8/2000 | .......... G11B/7/135 |
| EP | 1128372 | 8/2001 | ............ G11B/7/12 |

OTHER PUBLICATIONS

R.M. Dickson et al: "Unidirectional Plasmon Propagation in Metallic Nanowires", Journal of Physical Chemistry. B, Materials, Surfaces, Interfaces and Bophysical, Washington, D.C.USA, vol. 104, No. 26, 2000, pp. 6095–6098.

H. Ditlbacher et al: "Spectrally Coded Optical Data Storage by Metal Nanoparticles" Optics Letters, Optical Society of America, Washington, D.C. USA, vol. 25, No. 8, Apr. 15, 2000, pp. 563–565.

J. Weeber et al: "Plasmon Polaritons of Metallic Nonowires For Controlling Submicron Propagation of Light" Physical Review, B. Condensed Matter, American Institute of Physics, New York US, vol. 60, No. 12, Sep. 15, 1999, pp. 9061–9068.

J. Takahara et al: "Guiding of a One–Dimensional Optical Beam With Nanometer Diameter" Optics Letters, Optical Society of America, Washington, US, vol. 22, No. 7, Apr. 1, 1997, pp. 475–477.

Copy of Search Report dated Apr. 10, 2002.

* cited by examiner

*Primary Examiner*—Phan T. H. Palmer
(74) *Attorney, Agent, or Firm*—Joseph S. Tripoli; Harvey D. Fried; Patricia A. Verlangieri

(57) ABSTRACT

Each guide has an elongated shape, comprises an input at one end and an output at the other end, is arranged on the surface such that all the input ends of all the guides can be simultaneously illuminated in one zone by said radiation to be switched. The invention is characterized in that each guide is produced in a different material; preferably, the guides have more or less the same dimensions, thereby enabling to obtain particularly economical switching means.

9 Claims, 2 Drawing Sheets

Figure 1:
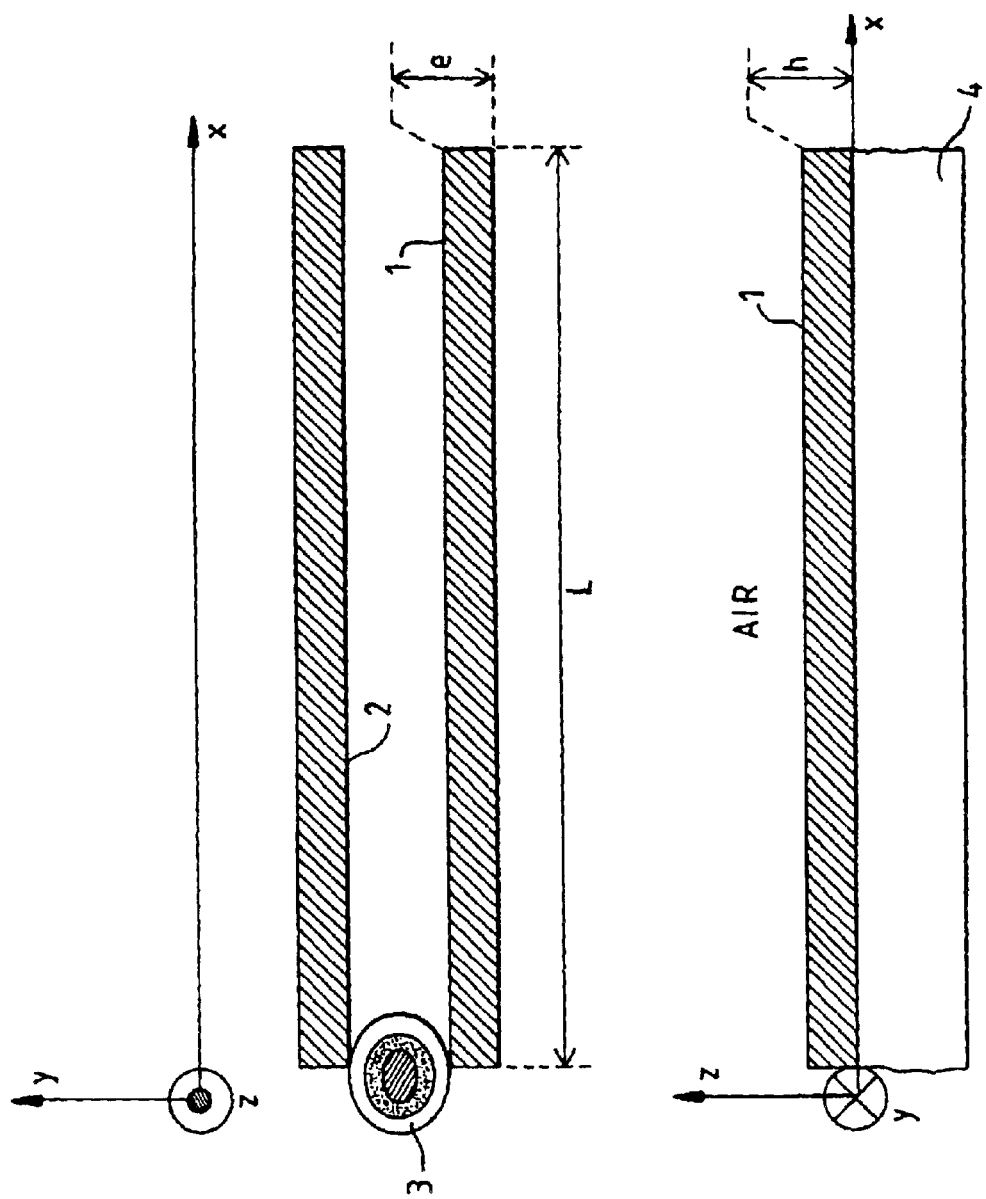

OPTICAL SWITCHING DEVICE COMPRISING TWO WAVEGUIDES WHEREOF BOTH SMALLEST DIMENSIONS ARE LESS THAN THE GUIDED WAVELENGTHS

This application claims the benefit, under 35 U.S.C. §365 of International Application PCT/FR01/03576, filed Nov. 15, 2001, which was published in accordance with PCT Article 21(2) on May 30, 2002 in French and which claims the benefit of French patent application No. 0015228, filed Nov. 24, 2000.

The invention relates to the use of radiation waveguides whose two smallest dimensions are smaller than the wavelengths of this radiation, which waveguides are capable, however, of guiding this radiation thanks to "plasmon" resonance phenomena.

The article entitled *"Plasmon polaritons of metallic nanowires for controlling submicron propagation of light"*, published on 15 Sep. 1999 in the journal Physical Review B, Vol. 60, No. 12, p. 9061–8, written by Jean-Claude Weeber et al., describes the principles of selective electromagnetic energy transport using metal "nanowaveguides" deposited on a dielectric substrate.

These elongate metal particles are, for example, deposited on the dielectric substrate using cathode-type lithographic methods.

This article gives examples illustrating these principles, based on the use, as "nanowaveguides", of elongate parallelepipeds whose two smallest dimensions, namely the height h and the width e, are smaller than the wavelength of the radiation to be selectively propagated within them:

by illuminating the end of a gold "nanowaveguide" having dimensions of 1500 nm×30 nm×15 nm, the normalized light intensity detected at the other end is a maximum (40%) for a wavelength of 835 nm and a minimum (zero) for a wavelength of 633 nm;

by illuminating the end of a "nanowaveguide", again made of gold, having dimensions of 1000 nm×30 nm×20 nm, the normalized light intensity detected at the other end is a maximum for a different wavelength, namely 770 nm.

Since the maximum transmission of these "nanowaveguides" depends on the wavelength to be transmitted, we may speak of selective electromagnetic energy transport or of a waveguide with spectral selectivity; the means used here to obtain this selectivity is based on the difference in dimensions, especially the two smallest dimensions, of the nanowaveguides which, in this case, are made in the same material.

That document describes the following example, shown in FIG. 9:

two identical "nanowaveguides" 1 μm in length are produced using the same material, are deposited on a dielectric surface and are placed parallel to each other at a distance of about 0.2 μm apart, so as to be able to simultaneously excite two neighbouring ends of these nanowaveguides using the same beam; these excitation ends are called "entrance" ends;

deposited at the other end of each "nanowaveguide" is a gold "nanoparticle", one having dimensions of 20 nm×30 nm×100 nm and the other dimensions of 30 nm×30 nm×100 nm; and the entrance ends of the nanowaveguides are illuminated simultaneously and it is found that, depending on the illumination wavelength, one or other of the nanoparticles scatters radiation.

Thus, this document teaches that a system comprising two nanowaveguides placed around the same point of illumination or entrance region and terminating in nanoparticles of different sizes makes it possible to excite a nearby particle of one or other of the nanowaveguides at the wavelength of the radiation used.

The means used here to excite the particle is based on the difference in particle size.

However, the construction of such a system remains difficult, especially because it requires the deposition of nanoparticles at the end of the nanowaveguides and the excitation of just a single particle, and also because it requires elements of different sizes to be deposited on the dielectric substrate.

The object of the invention is to avoid this drawback.

For this purpose, the subject of the invention is an optical switching device for switching radiation, comprising a surface provided with radiation waveguides each having an elongate shape, each comprising an entrance at one end and an exit at the other end, the two smallest dimensions of each waveguide being smaller than the wavelengths of the said radiation, these waveguides being placed on the surface so that all the entrance ends can be simultaneously illuminated by the said radiation to be switched, characterized in that each waveguide differs by the material of which it is made.

The invention may also have one or more of the following features:

the said material is chosen from the group comprising gold, silver, aluminium, copper and mixed indium tin oxide;

the nature of the material of the waveguides and the dimensions of the waveguides are adapted in order to obtain, within the said waveguides, electron plasma resonance for at least one possible wavelength of the said radiation to be switched;

The excitation wavelength of the resonance corresponds in general to quite a broad range of wavelengths centred on a peak at which the resonance is at maximum; preferably, the resonance wavelengths of the said waveguides are all between 350 nm and 1100 nm;

the waveguides deposited on the same surface have approximately the same dimensions.

The dimensions are therefore precluded from acting as selectivity means or as switching means, as in the prior art; because of this additional feature, waveguides of different types but of the same size may be deposited more economically, using the same process with the same settings; thus, optical switching of the radiation is then achieved using waveguides of identical size but different in nature, and this allows an optical switching device to be fabricated inexpensively.

The expression "approximately identical dimensions" is understood to mean the waveguide dimensions that can be achieved using the same deposition process and the same adjustments; preferably, the said two smallest dimensions of the waveguides do not exceed 100 nm; typically, the two smallest dimensions of the waveguides are around 40 nm.

The subject of the invention is also an optical system comprising one entrance and several exits, characterized in that it comprises an optical switching device according to the invention, the entrance of the system being designed to illuminate simultaneously all the entrance ends of the said waveguides, each of the exit ends of the said waveguides being connected to an exit of the system.

The invention applies most particularly to a device for optically reading, at at least two different wavelengths, digital data stored on a medium, such as an optical disc, and comprising, for reading at the different wavelengths, a device for optically switching the said various wavelengths.

Some optical discs for storing digital data have various recording layers that can be read simultaneously provided that read laser beams of different wavelengths are employed, each tailored to one recording layer.

On other optical discs for storing digital data, the data is accessible by luminescence and also requires an optical read device operating at different wavelengths.

Other optical discs, such as for example those in which the data is stored in the form of "plasmons", require read devices operating at at least two different wavelengths.

The optical read devices for reading such data media therefore include means for switching the various read or luminescence wavelengths; for this purpose, it is advantageous to use an optical switching device for switching the data read radiation, comprising a surface provided with radiation waveguides, each having an elongate shape, each comprising an entrance at one end and an exit at the other end, the two smallest dimensions of each waveguide being smaller than the wavelengths of the said radiation, these waveguides being placed on the surface so that all the entrance ends can be simultaneously illuminated in one region by the said read radiation.

Preferably, each waveguide differs by the material of which it is made.

Such a switching device is very light and very compact; it can therefore be very easily integrated into the read head of the read device.

Figure 2:
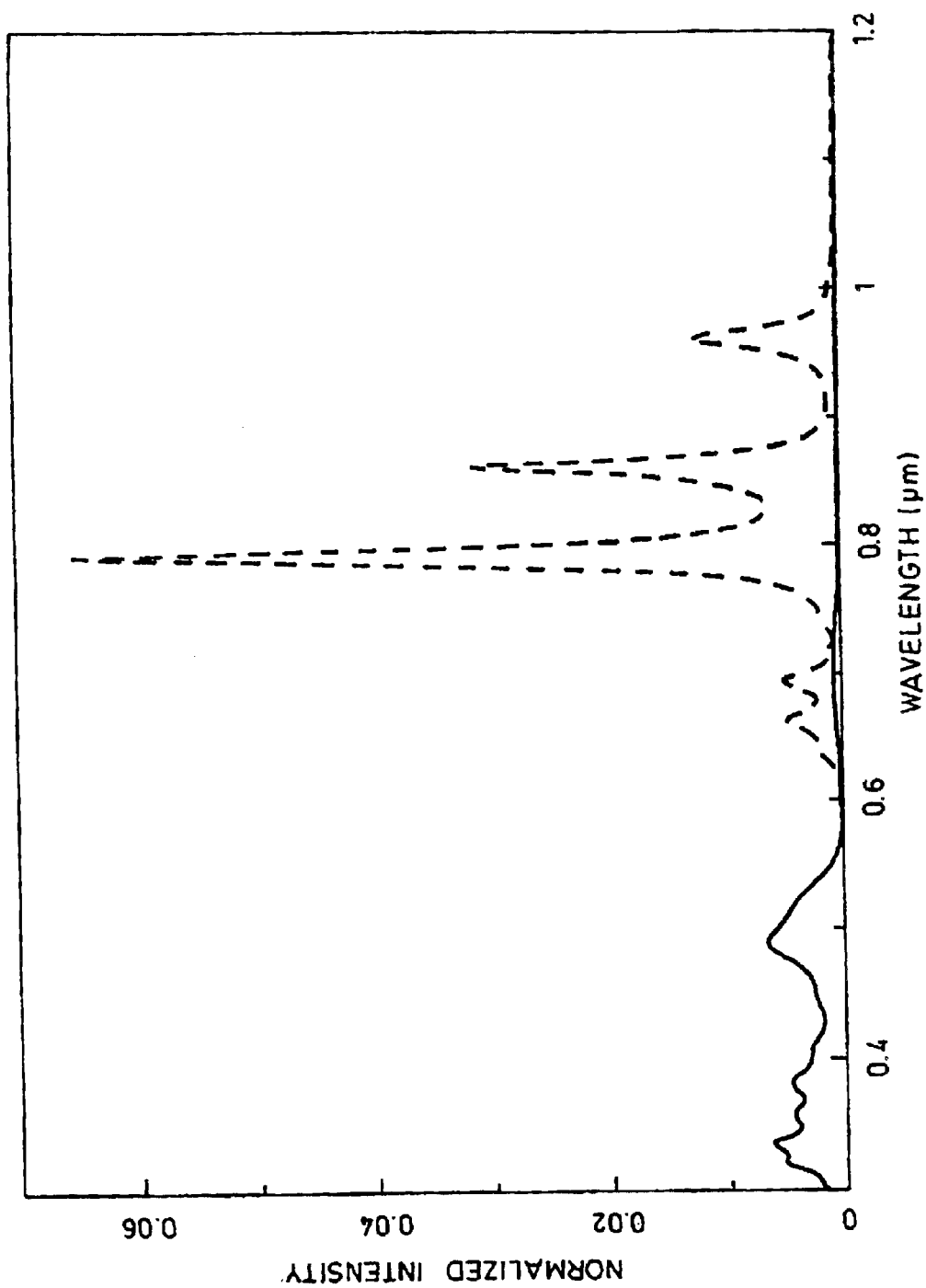

The invention relating to the switching device will be more clearly understood on reading the description that follows, given by way of non-limiting example and with reference to the appended figures in which:

FIG. 1 shows a diagram of the device according to the invention—the upper part in top view and the lower part in side view; and FIG. 2 shows the normalized scattered intensity at the exit end of the waveguides of the device according to the invention as a function of the wavelength.

Using conventional cathode-based lithography methods, waveguides 1, 2 of identical dimensions, but differing in type, are deposited on a glass substrate 4 having an index of 1.5; the device shown schematically in FIG. 1 is thus obtained.

The first waveguide 1 is made of aluminium and the second waveguide 2 is made of gold; the common dimensions of the waveguides are 2 000 nm×40 nm×40 nm; the waveguides are placed so as to be parallel and at a distance of about 0.1 $\mu$m apart, that is to say at a distance large enough to avoid any direct coupling effect between them but small enough for it to be possible for the two neighbouring ends of these nanowaveguides to be simultaneously excited using the same light beam, these two ends being consequently termed entrance ends and the other ends termed exit ends.

We will now show how the device thus obtained can be used as an optical switching means.

As shown in FIG. 1, the beam of the radiation to be switched is made to converge on an entrance region 3 straddling the entrance ends of the two guides.

This incident radiation may be focused through the glass substrate by a suitable optical device such as, for example, an immersion objective; it is possible to choose a value close to 1.5 as refractive index of the immersion oil of this objective; it is possible to choose a value close to 0.9 as the optical aperture of this objective.

Using suitable computing means known per se, the scattered intensity at the exit end of the guides under the abovementioned excitation conditions is evaluated; the results were obtained at a distance of around 30 nm above the upper surface of the exit end of the guides; the results are normalized to the incident light and are plotted in FIG. 2—the continuous line is for the aluminium waveguide and the broken line is for the gold waveguide; the peaks in these figures correspond to the wavelengths capable of exciting the electron plasma resonance within the corresponding waveguide; for example, a maximum resonance is observed at 489 nm within the aluminium waveguide, and is observed at 790 nm within the gold waveguide.

Under these excitation conditions, by observing the spatial distribution of the electromagnetic field intensity along the waveguides:

under 489 nm excitation, it is found that the electromagnetic wave propagates only in the aluminium waveguide;

under 694 nm excitation, it is found that the electromagnetic wave propagates simultaneously in both waveguides; and under 790 nm excitation, it is found that the electromagnetic wave propagates essentially only in the gold waveguide.

Thus, the system thus obtained can therefore be really used as an optical switching means.

According to an alternative embodiment of the invention, several nanowaveguides, of identical dimensions but of different materials, are deposited on the glass substrate so as to obtain more than two exits, the entrance being still shared between the various nanowaveguides; according to this embodiment, the nanowaveguides are arranged, for example, as a star around the entrance or excitation region on which the incident beam converges; these various materials will be chosen in a manner known per se so that the wavelengths for maximum resonance do not overlap.

The optical switching device according to the invention is less expensive than those of the prior art, especially because all the nanowaveguides of this device have the same size and can be produced using the same deposition process with the same settings.

The optical switching device according to the invention may advantageously be integrated into an optical read device for reading a digital data storage medium.

What is claimed is:

1. Optical switching device for switching radiation, comprising a surface provided with radiation waveguides each having an elongate shape, each comprising an entrance at one end and an exit at the other end, the two smallest dimensions of each waveguide being smaller than the wavelengths of said radiation, these waveguides being placed on the surface so that all the entrance ends can be simultaneously illuminated in a region by said radiation to be switched, wherein each waveguide differs by the material of which it is made.

2. Optical switching device according to claim 1, wherein the nature of the material of the waveguides and the dimensions of the waveguides are adapted in order to obtain, within said waveguide, electron plasma resonance for at least one possible wavelength of said radiation to be switched.

3. Optical switching device according to claim 2, wherein the resonance wavelengths of said waveguide are all between 350 nm and 1100 nm.

4. Optical switching device according to claim 1, wherein said material is chosen from the group comprising gold, silver, aluminium, copper and mixed indium tin oxide.

5. Optical switching device according to claim 1, wherein the waveguides deposited on the same surface have approximately the same dimensions.

6. Optical switching device according to claim 1, wherein said two smallest dimensions of the waveguides do not exceed 100 nm.

7. Optical system comprising one entrance and several exits, wherein it comprises an optical switching device according to claim 1, the entrance of the system being designed to illuminate simultaneously all the entrance ends of said waveguide, each of the exit ends of the said waveguides being connected to an exit of the system.

8. Device for optically reading, at at least two different wavelengths, digital data stored on a medium, such as an optical disc, and comprising, for reading at the different wavelengths, an optical switching device for switching the data read radiation, comprising a surface provided with radiation waveguides, each having an elongate shape, each comprising an entrance at one end and an exit at the other end, the two smallest dimensions of each waveguide being smaller than the wavelengths of said radiation, these waveguides being placed on the surface so that all the entrance ends can be simultaneously illuminated in one region by said read radiation.

9. Device according to claim 8, wherein each waveguide differs by the material of which it is made.

* * * * *